United States Patent Office 3,328,137
Patented June 27, 1967

3,328,137
RAPID IGNITION CHARCOAL BRIQUETTE AND
METHOD OF MAKING THE SAME
Frederick C. Mennen, Michigan City, Ind., assignor to
United States Packaging Corporation, Michigan City,
Ind., a corporation of Indiana
No Drawing. Filed Aug. 27, 1965, Ser. No. 483,358
6 Claims. (Cl. 44—17)

This invention relates to a rapid ignition charcoal briquette and method of making the same. More particularly, the invention relates to an improvement upon a self-starting charcoal briquette of the type which will be ignited by a movement thereof in contact with a friction surface and which is impregnated with starter material to initiate ignition and combustion, to insure rapid combustion throughout the briquette and to sustain combustion by generating oxygen as combustion occurs.

This invention is an improvement upon the invention covered by my prior application, Ser. No. 331,146, filed Dec. 17, 1963, for Self-Starting Charcoal Briquette and Method of Making the Same.

The primary object of this invention is to provide a novel, inexpensive, self-starting and rapid ignition charcoal briquette.

A further object is to provide a method of forming a rapid ignition charcoal briquette which utilizes a starter material in liquid solution to facilitate safe, rapid and economical manufacture of charcoal briquettes.

Other objects will be apparent from the following specification.

The briquettes are composed of granular charcoal having mixed therewith a combustion initiating and sustaining agent and a binder.

The granular charcoal is preferably a hardwood charcoal of retort grade. This type of charcoal is preferred because it produces minimum odor while burning. It will be understood, however, that other charcoal, such as lignites and kiln charcoal may be used, particularly in cases where the characteristic odors are not objectionable, or where such odors can be masked. I prefer to use a charcoal of particle size which will pass through a number 20 screen. However, charcoal may be used which will pass through screens in the range from No. 20 to No. 50.

The material employed in the briquettes to initiate and sustain combustion and to supply oxygen for the support of combustion is preferably sodium chlorate which has been treated with a dessicant, such as magnesium oxide, to maintain the material in granular condition.

The binder to be used in the briquettes may be any organic binder in solution in a wide range of binders. I prefer to use starch as a binder. However, other binders which may be used include hydroxylpropylmethyl cellulose, magnesium aluminum silicate, dextrin, gum arabic, gum tragacanthe, gum guar, gum karaga, locust bean gum, agar agar, and okra gum. Also usable in binder solutions are polyvinyl alcohol, sodium carboxymethylcellulose, dextrose, gelatine, glucose, carbowax, molasses, lactose, pitch or asphaltum, sulphite waste liquor (lignon or galac), sucrose, beeswax and ethylene maleic anhydride. The binder used will preferably be in a solution which will facilitate substantially uniform wetting of a briquette-forming material thereby, with resultant uniformity of a briquette structure.

The proportions in which the various components of the charcoal briquettes are utilized are preferably substantially as follows: charcoal 80% to 84% by weight; the starter material to initiate and sustain combustion and to supply oxygen approximately 11% to 15% by weight; and binder material 4% to 6% by weight. The amount of moisture utilized will preferably be the minimum quantity needed for the purpose of uniformly dispersing the starter solution and the binder with charcoal in the mixture from which the briquette is formed and which will produce optimum results when tableting or forming the mixture. The moisture content will preferably range from 9.5% to 11.1%.

One preferred composition of the briquette consists of:
(a) No. 20 screen size granular hardwood retort charcoal, 82% of the briquette forming batch by weight;
(b) A solution of sodium chlorate of 54.2% concentration with a specific gravity of 1.50 at a temperature in the range from 150° F. to 160° F., 13% by weight per batch;
(c) A starch solution, 5% by weight per batch.

The moisture content of the batch is preferably initially 10.85% at the start of tableting operation, and is gradually reduced to substantially 9.9% as the tableting operation proceeds.

Granulated sodium chlorate which has a dessicant, such as magnesium oxide, mixed therewith to maintain granulation, is prepared for use in the process of dissolving the same in water at a temperature of 150° F. to 160° F. and preferably at 155° F. Water is added as required to yield a 54.2% salt solution with a specific gravity of 1.50 at the temperature above mentioned.

The method of producing a briquette from the components and of the proportions above named entails placing the granular charcoal in an amount equalling the desired percentage of the batch or mixture in a blender, such as a ribbon paddle type of blender whose blades or paddles are revolved. While the blender blades are rotating the sodium chlorate solution is added to the charcoal in the blender in a quantity equalling the desired percentage of the batch or mixture. The mixing of the sodium chlorate solution with the charcoal in the blender continues for a period of approximately five minutes. Thereafter the starch binder solution is added in a quantity to equal the desired percentage of the batch or mixture, and the mixture is blended for approximately four minutes. The amount of moisture in the mixture is preferably substantially 9.9% after the tableting operation is under way, but is preferably in the order of 10.85% to facilitate initial tableting, and is gradually reduced to the 9.9% level.

After the mixture has been prepared, it is removed from the blender and placed in tablet-forming equipment of well known character and capable of applying high pressure, such as a pressure of 15,000 pounds per square inch. After briquettes have been formed in the tablet-forming equipment, the briquettes are placed in a forced draft air oven to dry. I prefer to heat the briquettes in a heating tunnel in which is maintained a temperature of from 220° F. to 230° F. and preferably a temperature of 225° F. The briquettes are subjected to the drying process for a period of thirty-five to forty-five minutes and preferably about forty minutes, during which time they are conveyed through the tunnel where a heating tunnel is used. The drying proceeds at such a rate that the residual moisture in the briquettes upon completion of the drying process is from 1% to 2%. The drying time may be reduced upon increase in the temperature in the range above indicated in order to achieve the desired residual moisture level at one to two percent. However, the time and temperature must be controlled carefully to avoid the occurrence of rapid crystallization which would carry excessive quantities of the sodium chlorate to the surface of the briquette. It is desirable that the concentration of the sodium chlorate at the surface should be greater than the concentration thereof throughout the remainder of the briquette, but a uniform rate of concentration of the sodium chlorate throughout the interior of the briquette is required to provide rapid combustion of the briquette throughout. The concentration of the sodium chlorate at the surface should be sufficient to facilitate rapid ignition, as by rubbing the briquette against a friction surface.

The briquette may be ignited by rubbing it against a friction surface or by applying a flame thereto. As ignition of the briquette proceeds, the internally distributed sodium chlorate is ignited, and a reaction commences which entails the liberation of oxygen. The liberation of oxygen insures smooth self-sustained ignition of the charcoal briquette, so that combustion of the briquette is not totally dependent upon atmospheric oxygen. The self-sustained combustion of the charcoal occurs in a reaction that is uniform through the briquette, is continuous and exothermic. As a result of this reaction the charcoal briquette reaches a glowing heat within approximately one minute, at which time it is ready for use. During this short starting interval the binder decomposes.

One of the important characteristics of the charcoal briquette above described is the ease and thoroughness with which it can be extinguished while burning. The briquette is soluble in water and consequently, when water in any substantial quantity is applied to the briquette while burning, the briquette is caused to dissolve. This insures that water for fire extinguishing purposes will reach all particles of the mixture constituting the briquette, and immediate and complete extinguishment of combustion throughout the briquette results.

By reason of the rapid ignition of the briquette, it can be used by placing a quantity of briquettes in contact with each other in a grill or hibachi. One of the briquettes can be ignited by rubbing the same against a friction surface or by subjecting it to a flame, and as it begins to sparkle at a controlled rate of ignition, it is placed in contact with one or more of the previously arranged briquettes. Ignition of the ignited briquette proceeds rapidly to uniform combustion therein, and the ignited briquette ignites the other briquettes which it contacts, and they in turn will ignite the briquettes which they contact, so that ignition of all briquettes is accomplished rapidly. Any smoke caused by disintegration of the binder material disappears substantially by the time complete combustion of all of the briquettes in the group has commenced.

It will be understood that the friction surface against which the briquette is rubbed to ignite the same is of the phosphorous type used on match boxes, an example of which is described in my co-pending application, Serial No. 331,146, filed Dec. 17, 1963.

While the preferred embodiment of the invention has been described, it will be understood that changes in the composition and the process may be made within the scope of the appended claims.

I claim:
1. The method of making a charcoal briquette consisting of the steps of mixing uniformly in a quantity of granular charcoal of a particle size to pass through a screen in the range from No. 20 to No. 50 mesh, an aqueous solution of sodium chlorate and a liquid organic binder in the following proportions: charcoal 80% to 84% by weight, sodium chlorate solution 11% to 15% by weight, and liquid binder 4% to 6% by weight, to produce a mixture having a moisture content of 9.5% to 11.1% by weight, then compressing said mixture at high pressure to form a briquette of desired shape and size and then drying said briquette in a forced draft oven at a temperature in the range from 220° F. to 230° F. to reduce the moisture content to from 1% to 2% by weight.

2. The method defined in claim 1 wherein said aqueous solution of sodium chlorate is a 52.4% salt solution having a specific gravity of 1.50 at a temperature between 150° F. and 160° F.

3. The method defined in claim 1, wherein said charcoal constitutes substantially 82%, said sodium chlorate solution consitutes substantially 13%, and said binder constitutes substantially 5% by weight of said mixture.

4. The method defined in claim 1, wherein the moisture content of said mixture is in the range between substantially 9.9% and substantially 10.85%.

5. The method defined in claim 1, wherein said briquette is dried by heating the same to a temperature in the range from 220° F. to 230° F. for a period of from 35 minutes to 45 minutes.

6. A charcoal briquette made by the method defined in claim 1 and characterized by distribution of sodium chlorate throughout the body of the briquette and crystallized at the surface of the briquette in increased concentration adequate to effect ignition when the briquette is rubbed against a phosphorous type of friction surface.

References Cited
UNITED STATES PATENTS

| | | | |
|---|---|---|---|
| 868,270 | 10/1907 | Hensinger | 44—17 |
| 1,112,547 | 10/1914 | Morin et al. | 44—17 |
| 1,959,472 | 5/1934 | Heffernan et al. | 44—17 X |
| 2,015,383 | 9/1935 | Konig et al. | 44—39 |
| 3,068,080 | 12/1962 | Ronzio | 44—17 |

FOREIGN PATENTS

| | | |
|---|---|---|
| 229,555 | 2/1925 | Great Britain. |
| 458,515 | 12/1936 | Great Britain. |

DANIEL E. WYMAN, *Primary Examiner.*

C. F. DEES, *Assistant Examiner.*